US012776174B2

(12) United States Patent
Giraud

(10) Patent No.: US 12,776,174 B2

(45) Date of Patent: Oct. 27, 2026

(54) METHOD FOR ESTIMATING A STATE OF WEAR OF A WIPER BLADE SYSTEM FOR A MOTOR VEHICLE

(71) Applicant: Valeo Systèmes d'Essuyage, Le Mesnil Saint Denis (FR)

(72) Inventor: Frederic Giraud, Le Mesnil Saint Denis (FR)

(73) Assignee: Valeo Systemes d'Essuyage, Le Mesnil Saint Denis (FR)

( * ) Notice: Subject to any disclaimer, the term of this patent is extended or adjusted under 35 U.S.C. 154(b) by 304 days.

(21) Appl. No.: 18/575,312

(22) PCT Filed: Jun. 30, 2022

(86) PCT No.: PCT/EP2022/068078

§ 371 (c)(1),
(2) Date: Dec. 29, 2023

(87) PCT Pub. No.: WO2023/275259

PCT Pub. Date: Jan. 5, 2023

(65) Prior Publication Data

US 2024/0312267 A1 Sep. 19, 2024

(30) Foreign Application Priority Data

Jun. 30, 2021 (FR) ...................................... 2107097

(51) Int. Cl.

| | |
|---|---|
| ***G07C 5/08*** | (2006.01) |
| ***G01M 99/00*** | (2011.01) |
| ***G07C 5/00*** | (2006.01) |
| ***G07C 5/10*** | (2006.01) |

(52) U.S. Cl.

CPC ........... *G07C 5/0816* (2013.01); *G01M 99/00* (2013.01); *G07C 5/008* (2013.01); *G07C 5/10* (2013.01)

(58) Field of Classification Search

CPC ........ G07C 5/0816; G07C 5/008; G07C 5/10; G01M 99/00; B60S 1/38; B60S 2001/3844

See application file for complete search history.

(56) References Cited

FOREIGN PATENT DOCUMENTS

| | | | | | |
|---|---|---|---|---|---|
| DE | 102012011538 | A1 | | 1/2013 | |
| DE | 102017208694 | A1 | * | 11/2018 | ............... B60S 1/38 |
| FR | 3056783 | A1 | | 3/2018 | |

(Continued)

OTHER PUBLICATIONS

DE102017208694 English translation.*

(Continued)

*Primary Examiner* — Xin Y Zhong

(74) *Attorney, Agent, or Firm* — Osha Bergman Watanabe & Burton LLP

(57) ABSTRACT

The present invention relates to a method for estimating a state of wear of a wiper strip of a wiper blade for a wiper system of a motor vehicle. The method is implemented by a mobile command terminal. The method includes activating the mobile communication terminal by communicating information to it via a human-machine interface, determining a geographical position of the motor vehicle, evaluating the state of wear of the wiper strip on the basis of the activation step and the geographical position, and generating an alert when the state of wear reaches a threshold level.

6 Claims, 1 Drawing Sheet

(56) References Cited

FOREIGN PATENT DOCUMENTS

| | | | | |
|---|---|---|---|---|
| FR | 3071794 | A1 | 4/2019 | |
| WO | WO-2018059869 | A1 * | 4/2018 | ............ B60S 1/0818 |

OTHER PUBLICATIONS

WO2018059869 English translation.*
International Search Report issued in corresponding International Application No. PCT/EP2022/068078 mailed Sep. 8, 2022 (6 pages).
Written Opinion issued in corresponding International Application No. PCT/EP2022/068078 mailed Sep. 8, 2022 (5 pages).

* cited by examiner

[Fig. 1]
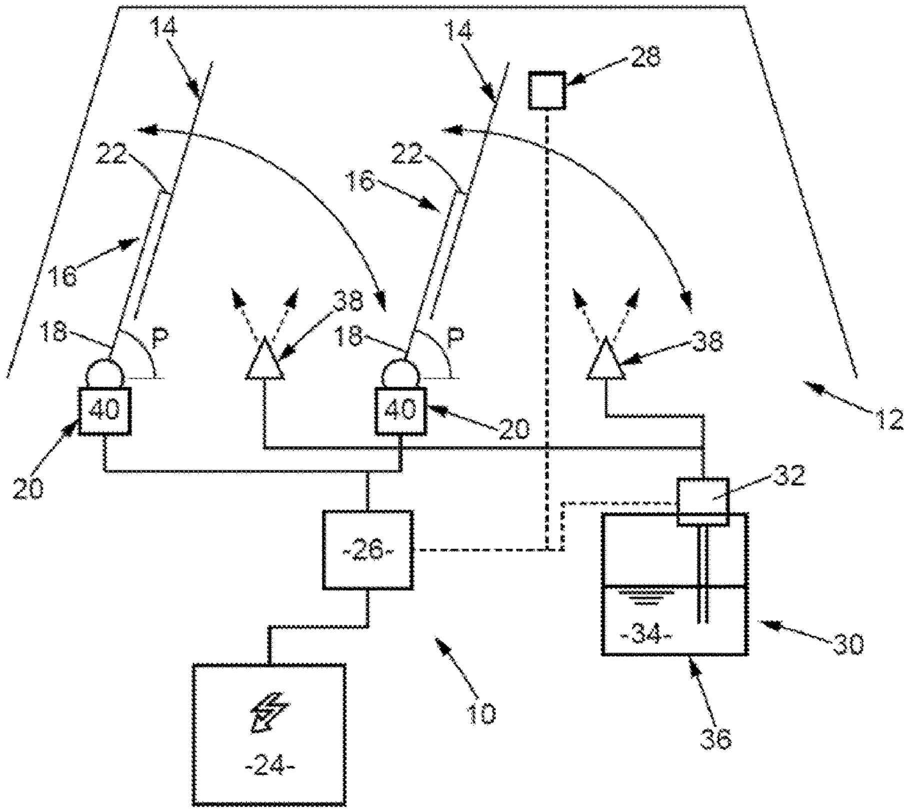
[Fig. 2]
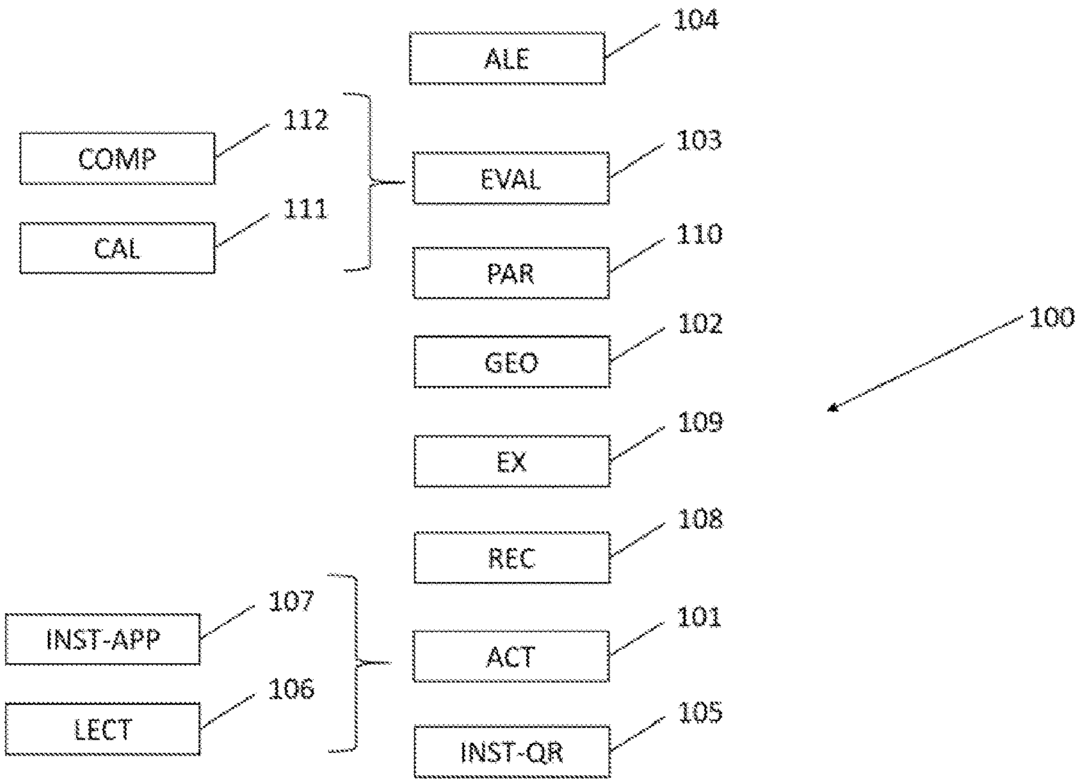

METHOD FOR ESTIMATING A STATE OF WEAR OF A WIPER BLADE SYSTEM FOR A MOTOR VEHICLE

The present invention relates to a method for estimating a state of wear of a wiper blade strip for a motor vehicle.

PRIOR ART

In a known manner, such a strip is mounted on a wiper arm such that, when the wiper arm performs an alternating wiping movement, a lip or free longitudinal edge made of rubber or elastomer of the wiper strip wipes the outer surface of the windshield of the motor vehicle.

The wiper strip is a consumable component because, in addition to the phenomenon of mechanical wear linked to friction resulting directly from wiping the outer surface of the window, the wiper strip is subject to various attacks resulting from environmental phenomena, and from pollution, and the wiper strip may also be damaged or destroyed by various obstacles present on the surface to be wiped.

In order to guarantee the utmost safety of use of the vehicle and in particular optimal conditions of visibility through the window, for example through the windshield, it is necessary for each wiper blade to be replaced by a new wiper blade having a new wiper strip when the latter reaches a predetermined level or rate of aging.

It is relatively simple and known practice to note the date of changing of the wiper blades, then, based on a period of installation recommended by the manufacturer, to replace them with a set of new wiper blades at the end of this period. However, such a solution is not satisfactory as it does not correspond to actual knowledge of the state of aging of the wiper strip.

Thus, a wiper strip may be replaced regularly, for example in a maintenance workshop. According to the most common procedure, the wiper strip is replaced after a predetermined length of time after being fitted, for example by fitting a new wiper blade and/or one comprising a new wiper strip. Such a procedure is based on the presumption that after a predetermined period of installation and use, the wiper strip, and usually the associated wiper blade, must be replaced, regardless of the conditions in which, during this predetermined period of installation on the vehicle, the wiper strip was actually used.

The wiper strip may also be replaced by the user or the driver of the vehicle themselves, depending on how they perceive the quality of the wiping performed by the wiper blade and the associated wiper strip fitted on the vehicle, when driving the vehicle themselves.

The aging of a wiper strip of a wiper blade, usually made of rubber or elastomer, natural or synthetic, is linked to various operating and usage parameters. As regards the wiper strip itself, it has been observed that most of the aging and deterioration occurs when the wiper is stopped, a phase during which the wiper strip, and in particular its free wiping edge, bears under pressure on the outer surface of the window, such as the windshield. More particularly, the environmental factors or parameters to which the wiper strip is subjected are the main sources of damage and aging over time. As regards environmental parameters, the outdoor temperature and solar radiation are the two most significant parameters. Thus, the various periods of parking of the vehicle during which it is exposed to solar radiation or ultraviolet radiation, and/or the vehicle is subjected to high temperatures, generally determine the rate of aging of the wiper strip.

As a result, depending on the conditions governing the life of the motor vehicle, the strip wears out more or less quickly, and it is essential to define a method for estimating the state of aging of the strip which is both simple and reliable.

SUMMARY

The present disclosure improves the situation.

To this end, it proposes a method for estimating a state of wear of a wiper strip of a wiper blade for a wiper system of a motor vehicle, implemented by a mobile communication terminal, comprising: a step of activation by communication of information to a mobile communication terminal, via a human-machine interface, a step of determining a geographical position of said motor vehicle, a step of evaluating the state of wear of said wiper strip on the basis of said activation step and said geographical position, and an alert step when the state of wear reaches a threshold level.

By virtue of the present invention, it is thus possible to anticipate changing of the wiper strips, via its mobile communication terminal, in a simple manner.

According to another aspect, during the activation step, the information is communicated through a visual representation of two-dimensional code.

According to another aspect, the method comprises a step of collecting at least one meteorological datum correlated to the geographical position of the vehicle.

According to another aspect, said at least one datum comprises at least one of the following: a datum representative of ultraviolet radiation to which the wiper strip is exposed, referred to as the ultraviolet radiation datum; a datum representative of an ambient temperature surrounding the wiper strip, referred to as the ambient temperature datum.

According to another aspect, during the step of evaluating the state of wear of the wiper strip, a rate of aging of the wiper strip is calculated on the basis of at least one of said ultraviolet radiation and ambient temperature data according to a formula depending on the ultraviolet radiation and/or the ambient temperature.

According to another aspect, said formula is of Arrhenius type.

According to another aspect, during the step of evaluating the state of wear, the rate of aging is compared to a threshold value.

According to another aspect, the method comprises a preliminary step of deleting any prior information on the state of wear of a wiper strip.

According to another aspect, the mobile communication terminal is a multifunction mobile telephone or a tablet.

The invention also relates to a computer program comprising instructions for implementing the step of evaluating the state of wear as described above, when the computer program is executed by a processor.

BRIEF DESCRIPTION OF THE DRAWINGS

Further features, details and advantages will become apparent on reading the detailed description below, and on studying the appended drawings, in which:

FIG. 1 is a schematic view of a vehicle windshield wiper system in which a method for estimating a state of wear of a wiper blade according to the present invention may be implemented.

FIG. 2 shows a flowchart of the estimation method according to the present invention.

DESCRIPTION OF THE EMBODIMENTS

Reference is now made to FIG. 1, which shows a system 10 for wiping a window 12 of a motor vehicle, in this case a windshield of the vehicle.

As shown in FIG. 1, the wiper system 10 comprises two wiper blades 14. Each wiper blade 14 is borne by a blade holder 16, also commonly called a wiper arm or driving arm.

In a known manner, not shown in detail, each wiper blade 14 includes at least one wiper strip, which is a flexible strip made of natural or synthetic elastomer and has a lower edge, with a longitudinal orientation in the longitudinal general direction of the wiper blade 14, which interacts with the outer surface of the windshield 12 so as to clean and/or wipe the latter. The working edge of the wiper strip is also called the lip of the wiper strip.

A proximal end 18 of each blade holder 16 is connected to a drive motor 20, while a distal end 22 of each blade holder 16 is connected to the wiper blade 14 that it bears.

Each drive motor 20 is designed to drive the blade holder 16 so as to wipe in an alternating pivoting motion, or a cyclical rotary motion, in a portion of a circular arc, about a pivot or rotational axis the general orientation of which is substantially orthogonal to the longitudinal general orientation of the blade holder 16. The successive positions of the blade holder 16 and the associated blade 14 during their cyclical rotary motion are described as a wiping operation.

In a known manner, each drive motor 20 includes an output shaft, not shown, that transmits a drive torque to the associated blade holder 16, directly or for example by way of a linkage.

Each drive motor 20 is for example an electric motor, and the drive motors 20 are connected to an electric power source 24, such as for example an accumulator battery of the vehicle or an alternator.

Each drive motor 20 is connected to the electric power source 24 by way of a unit 26 for controlling and managing the wiper system 10.

The control and management unit 26 is designed and configured in particular to manage the operation of the wiper system 10 according to a plurality of predefined use programs, for example by controlling the rotary driving speed of the blade holders 16 by regulating the current supplied to the drive motors 20, for a given value of the supply voltage of the drive motors 20 supplied by the electric power source 24.

By way of addition and without limitation, the wiper system 10 also comprises a rain sensor 28 that is linked to the control and management unit 26.

The wiper system 10 also in this case comprises a device 30 for cleaning the outer surface of the windshield, which device includes a pump 32 which is connected to the control and management unit 26 and to the electric power source 24, and which is designed to draw windshield washer liquid 34 from a reservoir 36 and convey it as far as means for spraying the liquid onto the outer surface of the windshield 12, these spray means for example being nozzles 38 arranged on the hood of the motor vehicle, or borne by the wiper blades 14, or by the blade holders 16.

In a known manner, each blade holder 16 is capable of occupying a position referred to as the service position or position of use when wiping, in which the wiping edge of the wiper strip of the wiper blade is in contact with the outer surface of the wiped window, specifically the windshield. In the service position of each blade holder 16, the latter may be driven in an alternating cyclical wiping motion by the drive motors 20. When the vehicle is parked and stationary, the wiper blade and the associated wiper strips are in their service position or in a storage position, referred to as the parking position.

The wiper system 10 also includes an angular position sensor 40 in the drive motor 20. The sensor 40 is configured to measure the angular position of the wiper blade in real time during the wiping operation. In FIG. 1, the letter P designates the position of the wiper blade 14/blade holder 16 assembly. The sensor 40 makes it possible in particular to stop each wiper blade 14 and associated blade holder 16 in the parking position when the wiping system is stopped.

During the life of the wiping system, the strips gradually wear out, particularly under the effect of various environmental stresses such as solar radiation and outdoor temperatures.

The present invention makes it possible to estimate the state of wear of the strips according to a method 100 which will now be described in detail. The method is advantageously implemented by a mobile communication terminal, preferably a smartphone. Alternatively, the mobile communication terminal may be a tablet, for example touchscreen, or a computer.

The method 100 makes it possible to anticipate changing of the wiper strips by estimating a time at which the strips will be sufficiently worn for replacement to be appropriate.

As can be seen in FIG. 2, the method 100 comprises a step ACT, referenced 101, of activating the method by communicating information readable by the mobile communication terminal via a human-machine interface. The human-machine interface may in particular be a screen and/or a keyboard of the mobile communication terminal.

Said machine-readable information is in the form of one- or two-dimensional barcodes. Preferably, the two-dimensional code is a QR code, which stands for "Quick Response" code.

Advantageously, the QR code is drawn on the packaging of a new wiper system which the user will fit on the motor vehicle. In other words, when a user buys a new set of wiper blades with packaging bearing a QR code, the method 100 makes it possible to determine when the strips will be worn, as explained in detail below.

Alternatively, the QR code may be inscribed directly on the wiper blade, in particular by engraving, printing or adhesive bonding. The QR code may be inscribed on the wiper blade, for example on a drive arm/wiper blade connection device, a spoiler, or on an endpiece.

The method 100 also comprises a step GEO, 102, of determining a geographical position of said motor vehicle. This step may be carried out by GPS determination, by the use of terminals of a telecommunications network, or by the user enabling location access, purely by way of example.

The method 100 comprises a step EVAL, 103, of evaluating the advancement of the state of wear of said wiper strip on the basis of said geographical position and the activation step 101.

The method 100 also comprises an alert step, ALE, 104, when the state of wear reaches a threshold level.

The steps of the method 100 will now be set out in a preferential, but non-limiting, chronological order.

Optionally, the method 100 includes a preliminary step INST-QR, 105, of installing a QR code reader on the mobile communication terminal.

Next, during the activation step 101, the QR code is read by the mobile communication terminal, using for example a window which appears on the screen of the terminal, in a reading step LECT, 106. A download link for the software application appears on the screen, preferably in the form of a web page.

The method 100 may also include a step of selecting a software application platform according to the operating system associated with the mobile communication terminal.

Once the selection has been made, the method 100 comprises a step 107, INST-APP, of installing the software application.

Advantageously, the method 100 also comprises a step (REC) 108 of collecting other information relating to the motor vehicle and/or the wiper system. This may include in particular the vehicle model, and/or registration and/or any type of distinctive information on the vehicle. The collection of this information makes it possible to differentiate the vehicle from other vehicles for which the application has already been downloaded, particularly in the case where the same user owns several vehicles.

Advantageously, the method 100 comprises a step (EX), 109, of detecting an application of the same type already existing on the mobile communication terminal, followed by a step of deleting the existing application, possibly preceded by a step of displaying a request for authorization to delete the existing application. These steps make it possible to avoid having an application that is still functional on the mobile communication terminal if the blade was changed before it had completed aging.

Step 102 is a step of obtaining a geolocation position of the motor vehicle, for example via GPS (Global Positioning System). According to a first variant, the geolocation position of the vehicle is entered manually by the user. According to another variant, the mobile communication terminal communicates via the software application with a GPS terminal of the motor vehicle to obtain the geolocation position. According to another variant, the geolocation position is that of the mobile communication terminal, which is considered to coincide with, or at least to be close to, the position of the motor vehicle.

Note that, since the wiper blade wears out, whether the vehicle is moving or stationary, a single geolocation position, that recorded as explained above, is sufficient. This position makes it possible to determine the advancement of the state of wear of the wiper blades, as will be described in detail.

According to a more complex variant, the application obtains, at a regular or irregular frequency, the successive geolocation positions of the vehicle by communication between the mobile communication terminal and the GPS terminal of the vehicle.

Advantageously, the method 100 comprises a step PAR, 110, of determining at least one environmental parameter, for example meteorological data, which are correlated to the geographical position or geographical location of the vehicle, for example by various weather stations, or by various weather data providers. The meteorological data is preferably sunshine and/or outdoor temperature.

Note that it is possible to take into account an outdoor temperature measured or estimated in real time, or an average temperature over a year, or a change in the average temperature depending on the season and/or to take into account the average daytime and nighttime temperatures, for the geolocation position mentioned above.

Similarly, depending on the geolocation position, it is possible to take into account sunshine measured or estimated in real time, or average sunshine over a year, or a change in the average sunshine depending on the season and/or to take into account the hours of darkness at night.

When the vehicle is stationary in a specific geographical position, it is also desirable to be able to determine whether it is parked outside or inside so that the taking into account of the meteorological data corresponds to the environmental conditions to which the wiper strip is actually subjected. For example, if the vehicle is parked indoors in a garage, in a covered or underground parking lot, or in a tunnel during daylight hours, then the wiper strip is not subjected to solar ultraviolet radiation, or to the outdoor temperature.

For this purpose, vehicle geolocation data and databases such as those used for vehicle guidance may be taken into account. For example, the geographical position of the vehicle may be analyzed and identified as that of a parking lot, for example in an airport zone.

Use may also be made of data provided by the sensor 28 available on board the vehicle such as an "RLTH" ("Rain Light Temperature Hygrometry") sensor which is installed behind the windshield and which provides various categories of information and data relating in particular to the presence or absence of rain on the windshield; the temperature inside the vehicle; the sunlight through the windshield, which makes it possible to determine whether the vehicle is in a tunnel or indoors; etc.

| Actual situation | Sunshine | No sunshine |
|---|---|---|
| Daytime | The vehicle is considered to be parked outdoors. | The vehicle is considered to be parked indoors, or to be in a tunnel. |
| Nighttime | The vehicle is considered to be parked outdoors. | The vehicle is considered to be parked outdoors. |

Other selection matrices are of course possible.

Depending on the results provided by the selection matrix above, the environmental data obtained which are correlated to the geolocation of the vehicle will for example be taken into account in the following way:

| | Temperature T | Ultraviolet Radiation I |
|---|---|---|
| The vehicle is considered to be parked outdoors. | T is the temperature θ provided by the weather station (for example the temperature under cover) | I is the UV index (between 1 and 11) according to the measurement taken by the weather station |
| The vehicle is considered to be parked indoors. | T = the temperature θ provided by the weather station +5° C. T = θ + 5° C. | I = 0 |

Data relating to sunshine and/or ultraviolet radiation can be expressed according to values other than the UV index, such as for example W/m$^2$.

Note that the UV index may also be chosen as an average constant relating to the geolocation position of the vehicle. Alternatively, it may be chosen to be zero.

The step EVAL, 103, of evaluating the advancement of the state of wear of said wiper strip on the basis of said geographical position according to one embodiment of the invention will now be described in detail.

Step 103 includes a step CALC, 111, of calculating a rate of aging TV. For example, an Arrhenius law is applied for these two series of data according to the formula:

$$TV = \int_{\theta}^{t} \left[ Ae^{-E/RT} + BI \right] dt$$

In this equation, A is a pre-exponential scale factor, I is the UV index of intensity of the solar radiation, B is a scale factor for the UV index of intensity of the solar radiation, E is activation energy, R is the ideal gas constant, T is the outdoor temperature. The temperature T and/or the UV index are determined according to one of the variants described above.

In the case where an average outdoor temperature Tmoy over a given period, for example over a year, and a zero UV index are considered, then the rate of aging TV is equal to $Ae^{-E/RTmoy}t$, where t is the period of use of the wiper system. The average UV index over a year at the geolocation position may also be considered.

It is also possible to use the combination of this law with a linear law taking into account the number of wiping cycles actually performed by the wiper strip according to the formula:

$$TV = CN + \int_{\theta}^{t} \left[Ae^{-E/RT} + BI\right]dt$$

In this equation, N is a number of window wiping cycles performed by the wiper strip, either measured or estimated, and C is a scale factor for the number N of wiping cycles. As a variant, account may also be taken, according to a linear law, of the number N' of washing and/or de-icing cycles, for example on the basis of the number of cycles of activation of the washing system pump or on the basis of an estimated value. This makes it possible to integrate the impact of washing and de-icing products on the wiper strip into the calculation of the rate of aging.

Step 103 also includes a step COMP, 112, of comparing the rate of aging TV to a threshold value, beyond which the wiper strip is considered to be worn. This step makes it possible to determine the time t at which the strip must be changed.

According to a first variant, the alert step ALE is triggered at the end of the evaluation step 103. Preferably, the time t is displayed on the screen of the mobile communication terminal. In this case, it is a future time. According to a second variant, the method 100 starts a clock and the alert step ALE is triggered when the time t is reached. In this case, it is a present time.

During the alert step, the user is warned by a visual indication displayed on their screen. Alternatively or in combination, the method 100 comprises a step of referring the user to a merchant site (internet or local) when the state of wear of the blade reaches the threshold. For example, a link to a web page is displayed on the screen, or the web page of the merchant site is displayed directly.

Thus, the method 100 according to the present invention ensures simple and reliable monitoring of the state of wear of the wiper strips, which makes it possible to anticipate replacement of the wiper blades.

The invention claimed is:

1. A method for estimating a state of wear of a wiper strip of a wiper blade for a wiper system of a motor vehicle, wherein the method is implemented by a mobile communication terminal, the method comprising:

activating the mobile communication terminal by communicating information to the mobile communication terminal, via a human-machine interface;

determining a geographical position of the motor vehicle;

collecting at least one meteorological datum correlated to the geographical position of the vehicle, wherein the at least one meteorological datum comprises a datum representative of ultraviolet radiation to which the wiper strip is exposed, referred to as the ultraviolet radiation datum;

evaluating the state of wear of the wiper strip on the basis of the activation step and the geographical position, wherein, during the evaluating of the state of wear, a rate of aging of the wiper strip is calculated based on the ultraviolet radiation according to a formula depending on the ultraviolet radiation, and the rate of aging is compared to a threshold value; and generating an alert when the state of wear reaches the threshold value.

2. The method as claimed in claim 1, wherein, during activation, the information is communicated through a visual representation of two-dimensional code.

3. The method as claimed in claim 1, wherein the formula is of Arrhenius type.

4. The method as claimed in claim 1, further comprising first deleting any prior information on the state of wear of a wiper strip.

5. The method as claimed in claim 1, wherein the mobile communication terminal is a multifunction mobile telephone or a tablet.

6. A non-transitory computer readable medium containing program instructions for causing a processor to perform the method of claim 1.

* * * * *